US011344955B2

(12) United States Patent
Majer et al.

(10) Patent No.: US 11,344,955 B2
(45) Date of Patent: May 31, 2022

(54) GUIDE TEMPLATE

(71) Applicant: Festool GmbH, Wendlingen (DE)

(72) Inventors: Michael Majer, Notzingen (DE); Jonathan Caputo, Leonberg (DE)

(73) Assignee: FESTOOL GMBH, Wendlingen (DE)

( * ) Notice: Subject to any disclaimer, the term of this patent is extended or adjusted under 35 U.S.C. 154(b) by 77 days.

(21) Appl. No.: 16/765,706

(22) PCT Filed: Nov. 12, 2018

(86) PCT No.: PCT/EP2018/080900
§ 371 (c)(1),
(2) Date: May 20, 2020

(87) PCT Pub. No.: WO2019/101558
PCT Pub. Date: May 31, 2019

(65) Prior Publication Data
US 2020/0298323 A1    Sep. 24, 2020

(30) Foreign Application Priority Data

Nov. 24, 2017   (DE) ......................... 102017127873.7

(51) Int. Cl.
    *B23B 47/28*        (2006.01)
(52) U.S. Cl.
    CPC ............ *B23B 47/28* (2013.01); *B23B 47/287* (2013.01); *B23B 2247/06* (2013.01); *B23B 2247/12* (2013.01); *B23B 2260/0482* (2013.01)
(58) Field of Classification Search
    CPC ... B23B 47/28; B23B 47/287; B23B 2247/12; B23B 2247/06; B23B 2247/08; B23B 2260/0482; B27F 5/12; Y10T 408/567
    See application file for complete search history.

(56) References Cited

U.S. PATENT DOCUMENTS

| 397,311 | A | * | 2/1889 | Schoff | ................... B23B 47/28 |
| | | | | | 408/79 |
| 2,633,040 | A | * | 3/1953 | Schlage | ................ B23B 47/287 |
| | | | | | 408/79 |

(Continued)

FOREIGN PATENT DOCUMENTS

| CN | 1392820 A | 1/2003 |
| CN | 105415077 A | 3/2016 |

(Continued)

*Primary Examiner* — Eric A. Gates
*Assistant Examiner* — Paul M Janeski
(74) *Attorney, Agent, or Firm* — Hoffmann & Baron, LLP

(57) ABSTRACT

A guide template having a tool guide for a working tool, for producing a main-side cut-out on a workpiece main-side surface of a workpiece which workpiece has a workpiece secondary-side surface, which is at an angle to the workpiece main-side surface and proceeding from which a secondary-side cut-out extends into the workpiece next to the workpiece main-side surface at a distance therefrom, wherein the guide template includes a main-side stop having a main-side stop surface for making contact with the workpiece main-side surface and includes a secondary-side stop, which has an engagement protrusion for engaging the secondary-side cut-out, wherein a longitudinal axis of the engagement protrusion extends toward the tool guide to an intersection region, in which the main-side cut-out to be produced and the secondary-side cut-out intersect, and is at an angle to a guide longitudinal axis of the tool guide, wherein the guide template includes a depth stop having a depth stop surface for a counter stop assigned to the working tool for limiting the penetration depth of the working tool into the workpiece with respect to the guide longitudinal axis.

28 Claims, 5 Drawing Sheets

(56) References Cited

U.S. PATENT DOCUMENTS

| | | | | |
|---|---|---|---|---|
| 2,674,906 A | * | 4/1954 | Timpner | B23B 47/28 |
| | | | | 408/79 |
| 2,792,727 A | * | 5/1957 | Mccuen | B27G 23/00 |
| | | | | 408/97 |
| 3,048,062 A | * | 8/1962 | Bass | B23B 47/287 |
| | | | | 408/97 |
| 3,241,453 A | | 3/1966 | Baldwin | |
| 4,011,024 A | * | 3/1977 | Nakano | B23B 47/28 |
| | | | | 408/79 |
| 8,376,333 B2 | | 2/2013 | Zander | |
| 2002/0187014 A1 | | 12/2002 | Bergner et al. | |
| 2010/0244342 A1 | | 9/2010 | Zander | |

FOREIGN PATENT DOCUMENTS

| | | | |
|---|---|---|---|
| CN | 105537653 | A | 5/2016 |
| DE | 3525852 | A1 | 1/1987 |
| DE | 4127679 | A1 | 2/1992 |
| DE | 19503994 | A1 | 8/1996 |
| DE | 102008008890 | A1 | 8/2009 |
| DE | 202015105439 | U1 | 6/2016 |
| DE | 202017101885 | U1 | 6/2017 |
| EP | 2564987 | A2 | 3/2013 |
| EP | 2639010 | A1 | 9/2013 |
| EP | 2910353 | A1 | 8/2015 |

\* cited by examiner

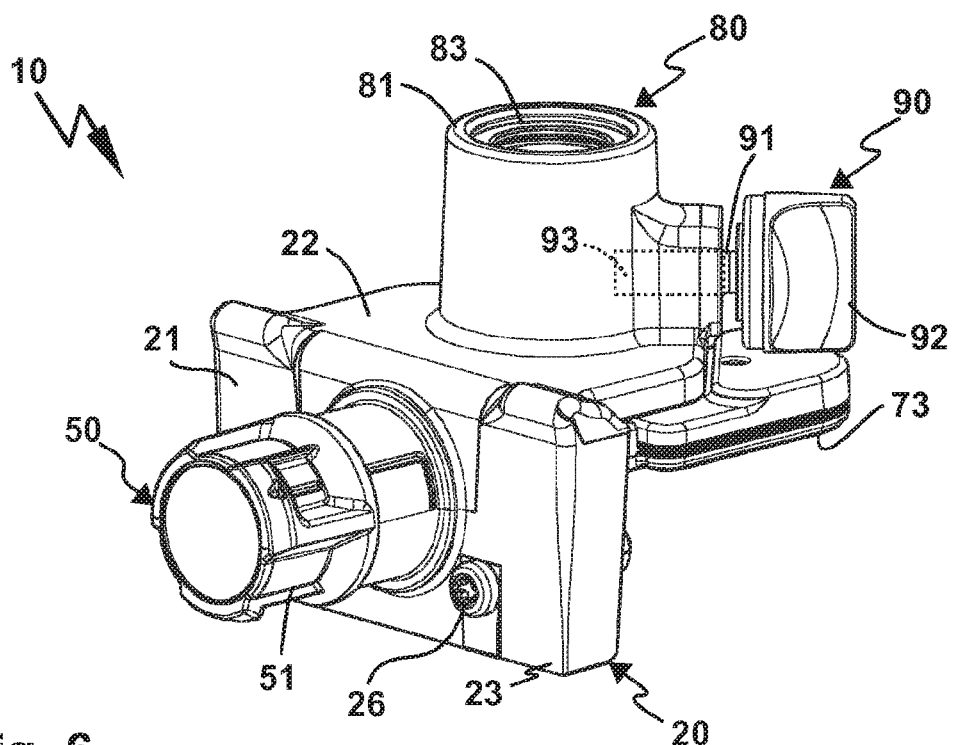
Fig. 6
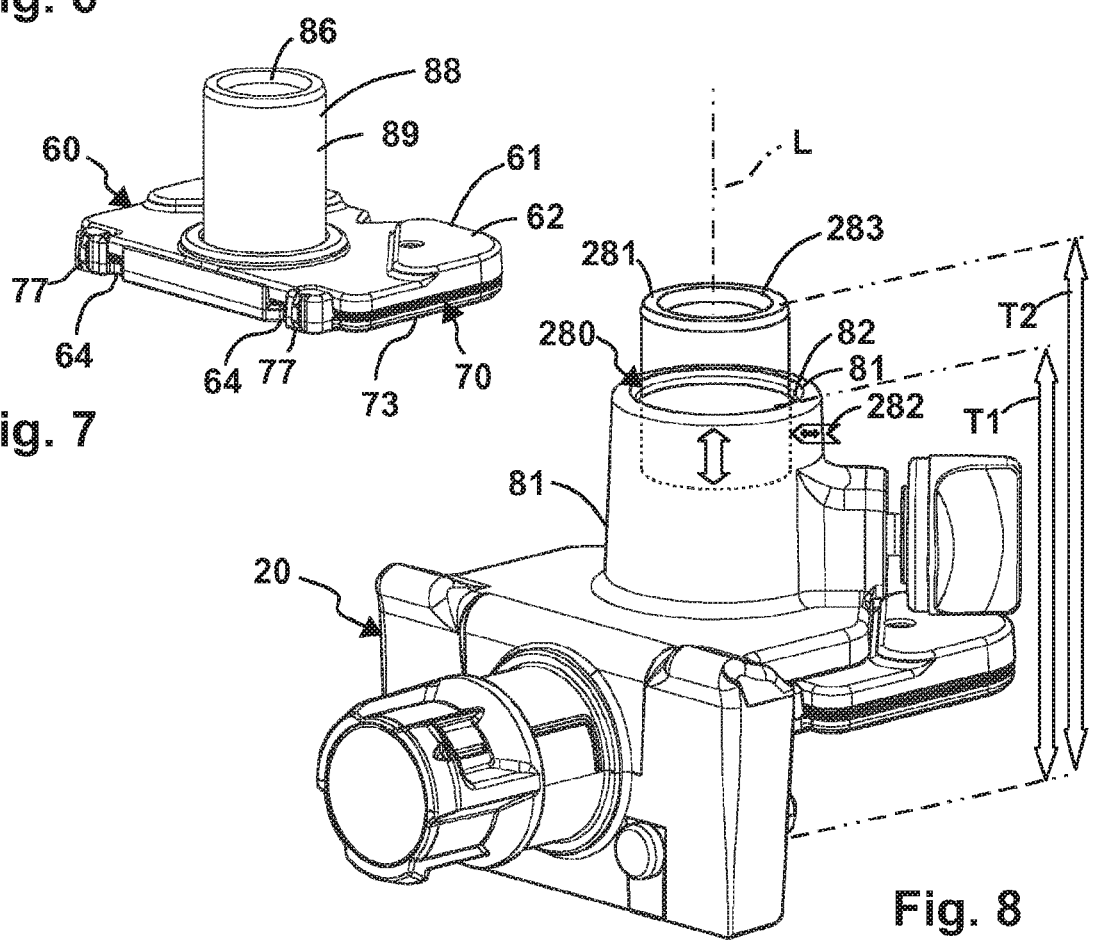
Fig. 7
Fig. 8

GUIDE TEMPLATE

This application claims priority based on an International Application filed under the Patent Cooperation Treaty, PCT/EP2018/080900, filed Nov. 12, 2018, which claims priority to DE 102017127873.3, filed Nov. 24, 2017.

BACKGROUND OF THE INVENTION

The invention relates to a guide template having a tool guide for a working tool, namely a drilling tool or milling tool, for producing a main-side cut-out on a workpiece main-side surface of a workpiece, which workpiece has a workpiece secondary-side surface, which is at an angle to the workpiece main-side surface and proceeding from which a secondary-side cut-out extends into the workpiece next to the workpiece main-side surface at a distance therefrom, wherein the guide template comprises a main-side stop having a main-side stop surface for making contact with the workpiece main-side surface and comprises a secondary-side stop, which has an engagement protrusion for engaging the secondary-side cut-out, wherein a longitudinal axis of the engagement protrusion extends toward the tool guide to an intersection region, in which the main-side cut-out to be produced and the secondary-side cut-out intersect, and is at an angle, in particular a right angle, to a guide longitudinal axis of the tool guide, wherein the guide template comprises a depth stop having a depth stop surface for a counter stop assigned to the working tool for limiting the penetration depth of the working tool into the workpiece with respect to the guide longitudinal axis.

Such type of guide template is described, for example, in DE 35 25 852 A1.

The workpiece main-side surface is, for example, an upper side or a lower side of the workpiece, for example of a furniture board. The workpiece secondary-side surface may be an end face of the workpiece, for example of the furniture board. Both the secondary-side cut-out and also the main-side cut-out, which communicate with one another in an intersection region, are to be incorporated into the workpiece to the extent that, for example, a fitting can be inserted into the two workpiece cut-outs.

Production of such type of workpiece cut-out arrangement is complicated, because precise dimensions and angle relations must be maintained between workpiece cut-outs, which is why a guide template for guiding the working tool is advantageous. A guide template is known for use in connection with so-called cookie-cutter milling machines, which has a main-side stop surface with a tool guide. With the known guide template, the engagement protrusion is adjusted relative to the main-side stop surface by means of the adjusting device, whereby the penetration depth of the working tool into the workpiece, however, is simultaneously changed. Thus, handling is also complicated, namely because the depth stop must be readjusted when a specific penetration depth of the working tool into the workpiece is desired.

SUMMARY OF THE INVENTION

Thus, the object of the present invention is to provide an improved guide template.

In order to achieve the object, it is provided with a guide template of the aforementioned type that the depth stop and the engagement protrusion are arranged on a carrier body, on which the main-side stop is mounted for adjustment by means of an adjusting device for adjusting a main-side stop distance of the main-side stop surface from the engagement protrusion while a depth-setting distance between the engagement protrusion, particularly a side of the engagement protrusion facing away from the main-side stop surface and/or an outer circumference of the engagement protrusion, and the depth stop surface is maintained, and the depth stop surface is mounted in an adjustable manner.

Advantageously, it is provided that an outer circumference of the engagement protrusion has a flat shape with flat sides opposite one another and narrow sides extending between the flat sides, particularly rounded narrow sides, for support in the secondary-side cut-out.

Preferably, a reference surface for the depth-setting distance is a side of the engagement protrusion facing away from the main-side stop surface, particularly the flat side or lower side of the engagement protrusion. The depth-setting distance between the main-side stop surface and the engagement protrusion, however, may also be based on a separate region and/or on an outer circumference of the engagement protrusion. Of course, the actual drilled or milled cutting of the main-side cut-out by means of the working tool can terminate before, in, or after the outer circumference or the outer circumferential contour of the engagement protrusion as relates to a working direction, along which the working tool cuts into the workpiece. Thus, the main-side cut-out may therefore extend starting from the lower side of the secondary-side cut-out, said lower side facing away from the workpiece main-side surface. The relation between the engagement protrusion and the main-side stop surface, i.e. the depth-setting distance, remains the same however.

The working tool is a milling tool or drilling tool and preferably is driven or can be driven automatically. Preferably, a manual power tool, for example, is a drilling machine, screwing machine, or milling machine, for driving the working tool. The guide template and the working tool may form one system. For example, the counter stop is arranged on a working tool suitable for the guide template, for example a drilling tool. Furthermore, it is possible that the manual power tool, for example a drilling machine or milling machine with a particularly electric drive motor, forms a component of a system comprising the guide template.

A basic concept of the present invention is that the relation between the engagement protrusion and the depth stop remains the same, while the main-side stop is adjusted by means of the adjusting device, i.e. the main-side stop distance between the engagement protrusion and thus the secondary-side cut-out and the workpiece main-side surface is adjustable, without changing the depth-setting position of the depth stop. This simplifies handling significantly.

The secondary-side cut-out is initially incorporated into the workpiece, wherein the main-side stop distance between the secondary-side cut-out, on the one hand, and the workpiece main-side surface, on the other, is not the same or exact in all cases. The secondary-side cut-out has, for example, a flat rectangular shape, wherein the narrow sides are rounded. Thus, this results in a flat rectangular cross-section of the secondary-side cut-out. For example, a first fitting element of the fitting, which is connected or to be connected to a fitting element, which is to be inserted into the main-side cut-out, is incorporated into the secondary-side cut-out, particularly by means of clamping, bracing, or the like. The main-side cut-out communicates with the secondary-side cut-out. The main-side cut-out and the secondary-side cut-out intersect in the intersection region.

The depth stop surface may be arranged directly on the working tool, for example may be formed by a flange projection or the like, which is provided on the drilling tool. However, it is also possible that the depth stop surface is situated on a machine tool, which is provided for driving the working tool. Thus, a stop rod or other stop body, for example, may be arranged on a drilling machine or milling machine, particularly the machine housing thereof, said stop rod forming or having the counter stop and making contact with the depth stop surface of the depth stop.

The secondary-side stop expediently has a secondary-side stop surface for making contact with the workpiece secondary-side surface. The engagement protrusion protrudes in front of the secondary-side stop surface in the direction of the main-side stop surface, particularly parallel to the main-side stop surface.

The secondary-side stop surface and the main-side stop surface of the guide template are preferably at an angle to one another, for example at a right angle. The angular position of the secondary-side stop surface and the main-side stop surface may be fixed, i.e. meaning that the angle is not adjustable. However, it is also possible that an angle of the secondary-side stop surface and of the main-side stop surface is adjustable. To this end, a type of miter bearing assembly, for example, is advantageous, with which the angular position of the main-side stop surface and of the secondary-side stop are adjustable relative to one another.

Furthermore, it is possible that the engagement protrusion has an end face or end surface, which simultaneously forms a stop surface for contact with a base of the secondary-side cut-out. Thus, the end surface or end face of the engagement protrusion makes contact with the base of the secondary-side cut-out such that the secondary-side stop is thereby formed. It is furthermore possible that the stop surface and the secondary-side stop surface are provided on the end face of the engagement protrusion.

With one embodiment of the invention, the intersection region may be provided such that the main-side cut-out exits basically in the secondary-side cut-out, i.e. does not protrude in front of the secondary-side cut-out. For example, a right-angled transition section is then provided between the two workpiece cut-outs, the secondary-side cut-out and the main-side cut-out.

One embodiment of the invention, however, may also provide that the depth stop, particularly the depth stop surface, is adjusted or can be adjusted to the extent that the working tool is pre-adjustable, as relates to the longitudinal axis of the guide, in front of a side facing away from the main-side stop surface, for example a lower side or a flat side, of the engagement protrusion, until the working tool makes contact with the depth stop surface. Thus, a drill hole can be produced, for example, which forms the main-side cut-out, and which, so to speak, drills through or extends through the secondary-side cut-out or protrudes in front of the secondary-side cut-out as relates to a longitudinal axis of the working tool or the guide longitudinal axis on a side facing away from the workpiece main-side surface.

A preferred concept provides that the engagement protrusion has a cut-out, for example a passage, an opening open toward the front, or the like, for the working tool. The working tool can be guided through the cut-out without damaging the engagement protrusion. For example, the cut-out or passage has a round shape, particularly a circular shape. The cut-out expediently has a cross-section which corresponds with a guide cross-section of the tool guide and which is flush therewith. By means of the cut-out, the working tool can engage or cut into the workpiece on a side of the of the engagement protrusion, said side facing away from the main-side stop surface.

Expediently, it is provided that the engagement protrusion has at least one contact surface for making contact with the workpiece directly next to the main-side cut-out to be produced by the working tool. For example, the contact surface is provided next to the aforementioned cut-out or passage for the working tool. The contact surface is advantageously used as tear-out protection for the workpiece, which is thereby less torn or not torn by the working tool during machining of the workpiece.

A preferred concept provides that the adjusting device is arranged on the tool guide or formed by the tool guide. The tool guide thus simultaneously forms, for example, at least one component of the adjusting device.

The tool guide expediently has a so-called drill bushing or other guide element, which has a passage or guide opening for the working tool.

The tool guide, particularly the guide element, for example the drill bushing, may have an inner cross-section or guide cross-section which directly correlates with the outer cross-section of the working tool, for example which is circular for a drilling tool. The inner cross-section, however, may also have a slot-like shape to the extent that the working tool can execute a longitudinal movement, particularly an oscillating longitudinal movement, within the guide cross-section.

It is advantageous, for example, when the adjusting device is formed by means of a guide element of the tool guide, particularly a so-called drill bushing, said guide element being adjustable along the longitudinal axis of the guide as relates to the carrier body, and/or when a guide element, which is adjustable along the longitudinal axis of the guide as relates to the carrier body, forms a component of the adjusting device.

It is preferable when the depth stop surface is fixed in position as relates to the carrier body. Thus, the same penetration depth of the working tool is always specified so to speak.

However, it is also possible that the guide template has a depth-setting device for adjusting a relative position of the depth stop surface as relates to the engagement protrusion. For example, the depth stop surface may be provided on a guide bush or other guide body, which is adjustable as relates to the engagement protrusion. The depth-setting body can expediently be fixed in one or more depth-setting positions as relates to the engagement protrusion by means of a position-fixing device, particularly a clamping device (a screw or the like), a latching device, a locking device, or the like. In any case, it is preferable when the depth stop surface is adjustable between at least two depth-setting positions and particularly can be fixed in said depth-setting positions, in which the working tool engages the workpiece at different depths as relates to the guide longitudinal axis.

A geometric configuration of the carrier body is preferable as follows. The carrier body expediently has an angular body or is formed by an angular body. It is preferable when the carrier body has a carrier leg and a contact leg, which are at an angle to each other, for example at a right angle or approximate right angle (particularly in an angle range of about) 88-92°. The adjusting device is arranged on the carrier leg. The secondary-side stop with the engagement protrusion or the engagement protrusion is arranged on the contact leg. For example, a or the secondary-side stop surface is provided on the contact leg for establishing contact with the workpiece secondary side. However, it is also possible that the engagement protrusion protrudes in front of the contact leg, for example protrudes at a right angle, and the contact leg is not provided and/or designed for direct contact with the workpiece secondary-side surface.

The tool guide may be arranged or provided completely or partially in the main-side stop or may be both.

It is also possible that the tool guide is provided or arranged completely or partially on the carrier body.

It is preferable when the tool guide is provided exclusively on one single component, particularly exclusively on the main-side stop or exclusively on the carrier body. The guiding contours are thereby provided on one and the same component and cannot implement any relative movement with respect to one another. The guiding contours of the tool guide, said guiding contours guiding the working tool, are expediently fixed on this single component and cannot be adjusted.

One exemplary embodiment may provide that the tool guide is arranged and provided partially on the carrier body and partially on the main-side stop. Thus, for example, a guide section of the tool guide, said guide section extending next to the main-side stop surface or guiding to the main-side stop surface, may be provided on the main-side stop or on the main-side stop surface, while a guide section of the tool guide is provided on the carrier body, said guide section being further away from the main-side stop surface. Consequently, both the carrier body and the main-side stop or main-side stop body can thus provide subsections of the tool guide.

With the depth stop, it is advantageous when it is provided or arranged on the tool guide or next to the tool guide. Furthermore, it is possible that the depth stop forms a component of the tool guide. For example, the depth stop surface may be provided on or next to the guide section of the tool guide, said guide section being arranged on the carrier body.

One preferred exemplary embodiment provides that the tool guide can be telescopic as relates to the guide longitudinal axis. Thus, a length of the tool guide can be set.

It is possible that the tool guide has a section which is fixed as relates to the carrier body and a guide section which is adjustable as relates to the guide longitudinal axis, said guide section particularly being connected or coupled to the main-side stop and being adjustable with respect to the guide longitudinal axis as relates to the first-mentioned guide section.

Furthermore, it is advantageous when the tool guide is guided on the carrier body or has a guide element, for example a guide bush, a guide tube, or the like, which is guided on the carrier body.

Preferably, the guide template, particularly the adjusting device, has a position-fixing device, particularly a clamping device and/or latching device and/or locking device, for fixing the main-side stop in at least two different main-side stop distances, as relates to the carrier body, between the engagement protrusion, particularly the outer circumference thereof, and the main-side stop surface.

Furthermore, the tool guide may have a guide element, which forms a component of the adjusting device. The guide element can be fixed in at least two placement positions as relates to the carrier body by means of the position-fixing device, said placement positions each corresponding to a main-side stop distance.

The carrier body preferably has a guide mount for a guide element, for example a guide bush, a guide tube, or the like, of the tool guide. The guide mount is preferably formed as a dome or bush. For example, the guide mount is provided on a tube body or tube element. The guide element is mounted preferably adjustably and/or can be fixed in position, as relates to the guide mount, as relates to the guide longitudinal axis. The guide mount and the guide element, for example, form components of the adjusting device, with which a main-side stop distance between the main-side stop surface and the engagement protrusion can be set or can be adjusted.

A position-fixing device, for example a clamping device, latching device, or the like, for fixing the position of the guide element of the tool guide as relates to the guide mount, is expediently arranged on or next to the guide mount. Thus, the guide element can be fixed in one or more longitudinal positions as relates to the guide mount, particularly for the purposes of fixing the main-side stop distance between the main-side stop surface and the engagement protrusion.

The main-side stop is expediently adjustably mounted and/or can be fixed on the carrier body of the tool guide as relates to the guide longitudinal axis by means of a guide element, for example a guide tube, a guide bush, or the like. Thus, the guide element forms a component of the adjusting device. However, it is further expedient when the main-side stop is guided on the carrier body by means of at least one additional guide component, for example the previously mentioned contact leg, on which the engagement protrusion is provided. In general, it is advantageous when the main-side stop is guided on the carrier body in a non-twisting manner as relates to the guide longitudinal axis. For example, a narrow side or end face of the main-side stop is situated on the secondary-side stop, for example the secondary-side stop surface, via a longitudinal extension, in order to implement the twist prevention.

The adjusting device expediently comprises a position-fixing device, for example a clamping device and/or latching device, for fixing the main-side stop in at least two different relative distances between the outer circumference of the engagement protrusion and the depth stop surface. The clamping device comprises, for example, a clamping screw or a clamping lever. The latching device may comprise, for example, a resilient latching element. Advantageous, the position-fixing device may also have, however, a locking device or a locking element.

With the guide template, it is furthermore expedient when it has a suction device, for example a suction connection, for suctioning particles which result during machining of the workpiece by the working tool. The suction connection is arranged, for example, on the carrier body. For example, a suction device, particularly a workshop vacuum cleaner, can be connected at the suction connection. The suction connection, for example, has a connecting piece for a suction pipe or a suction tube.

However, it is also possible that the guide template has an active suction device with a suction unit and/or a dust-collection container or particle-collection container.

A preferred concept provides that the suction device has at least one intake opening for suctioning particles, which is arranged on the engagement protrusion. At least one intake opening of this type may also be provided on a contact surface or stop surface provided for making contact with the workpiece main-side surface or workpiece secondary-side surface, for example the secondary-side stop surface and/or the main-side stop surface. An intake opening on the engagement protrusion has the advantage that the guide template can be suctioned so to speak onto the workpiece once the engagement protrusion has already engaged the secondary-side cut-out.

At least one intake opening can be used, to this end, to suction in secondary air, namely air not loaded with particles, to prevent the guide template from being lifted off or suctioned away, for example, from the workpiece and/or to prevent an excessive vacuum from developing in the area of the suction device or with the suction device.

The at least one intake opening expediently communicates with the previously mentioned suction connection.

However, the least one intake opening may also be provided next to a contact surface provided for establishing contact with the workpiece main-side surface or workpiece secondary-side surface. Thus, dust or similar types of particle contamination can be suctioned, so to speak, from the workpiece main-side surface or workpiece secondary-side surface via the intake opening.

The main-side stop surface and/or a or the secondary-side stop surface provided to establish contact with the workpiece secondary-side surface are preferably flat surfaces or have a flat shape. It is also possible that contact protrusions of the main-side stop surface and/or of the secondary-side stop surface have end faces, which are situated in a common flat plane. The end faces can then be positioned making contact with a planar or flat workpiece surface. One or both of the stop surfaces, for example, may also have an elastic rubber covering or another flexible quality.

Furthermore, it is expedient when the tool guide for guiding the working tool has an inner circumferential contour, which limits a guide cross-sectional surface, which is round or circular for example or has a flat shape with longitudinal sides and narrow sides which are shorter as relates to the longitudinal sides. The narrow sides may extend in a straight line or be straight sides, but also may be rounded. Preferably, the inner circumferential contour of the tool guide with the flat design corresponds to the flat shape of the outer circumferential contour of the engagement protrusion both geometrically and/or as relates to the surface.

The guide longitudinal axis preferably extends through the guide cross-sectional surface at a right angle.

The longitudinal axis of the engagement protrusion and the longitudinal axis of the guide expediently extend at right angles to one another.

The main-side stop expediently comprises a plate body. The main-side stop surface is expediently provided on a side of the main-side stop or of the plate body, said side facing the workpiece or being assigned to the workpiece.

The main-side stop is expediently penetrated by a guide element of the tool guide or has a guide element of the tool guide.

The or a guide element of the tool guide expediently protrudes in front of the main-side stop in the direction of the carrier body.

BRIEF DESCRIPTION OF THE DRAWINGS

An exemplary embodiment of the invention is explained on the basis of the figures in the following. The following is shown.

DETAILED DESCRIPTION

Figure 3:
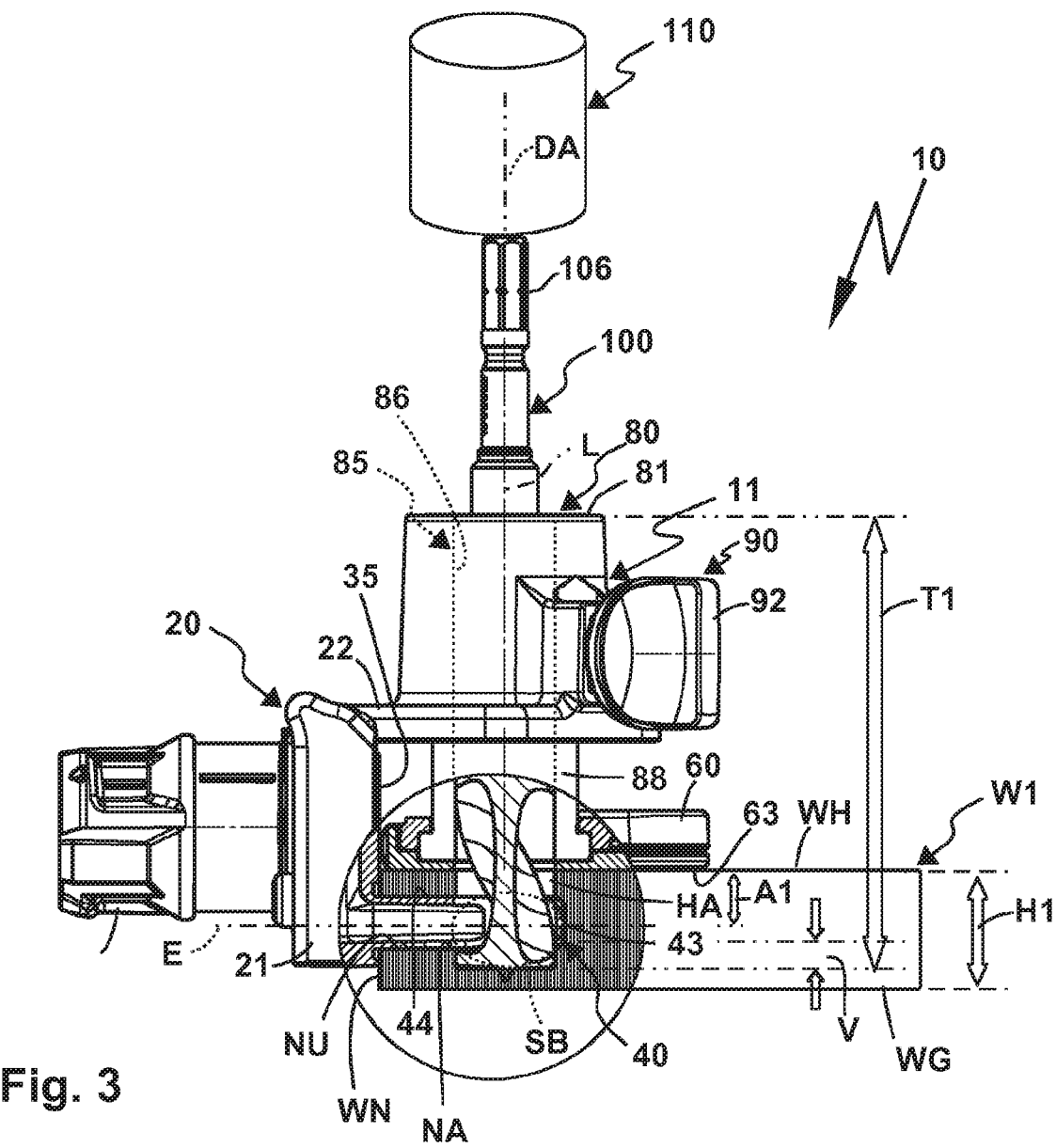
Figures 9, 10:
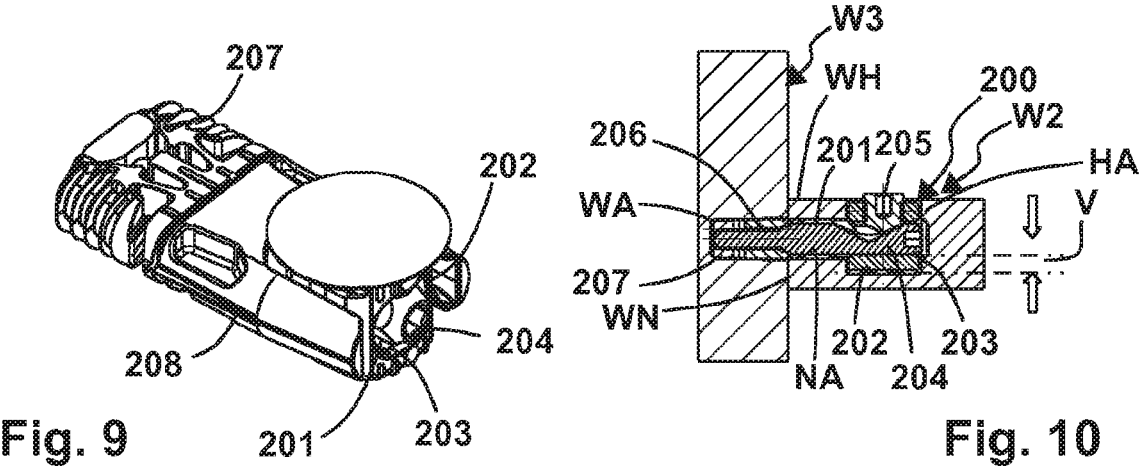
Figure 4:
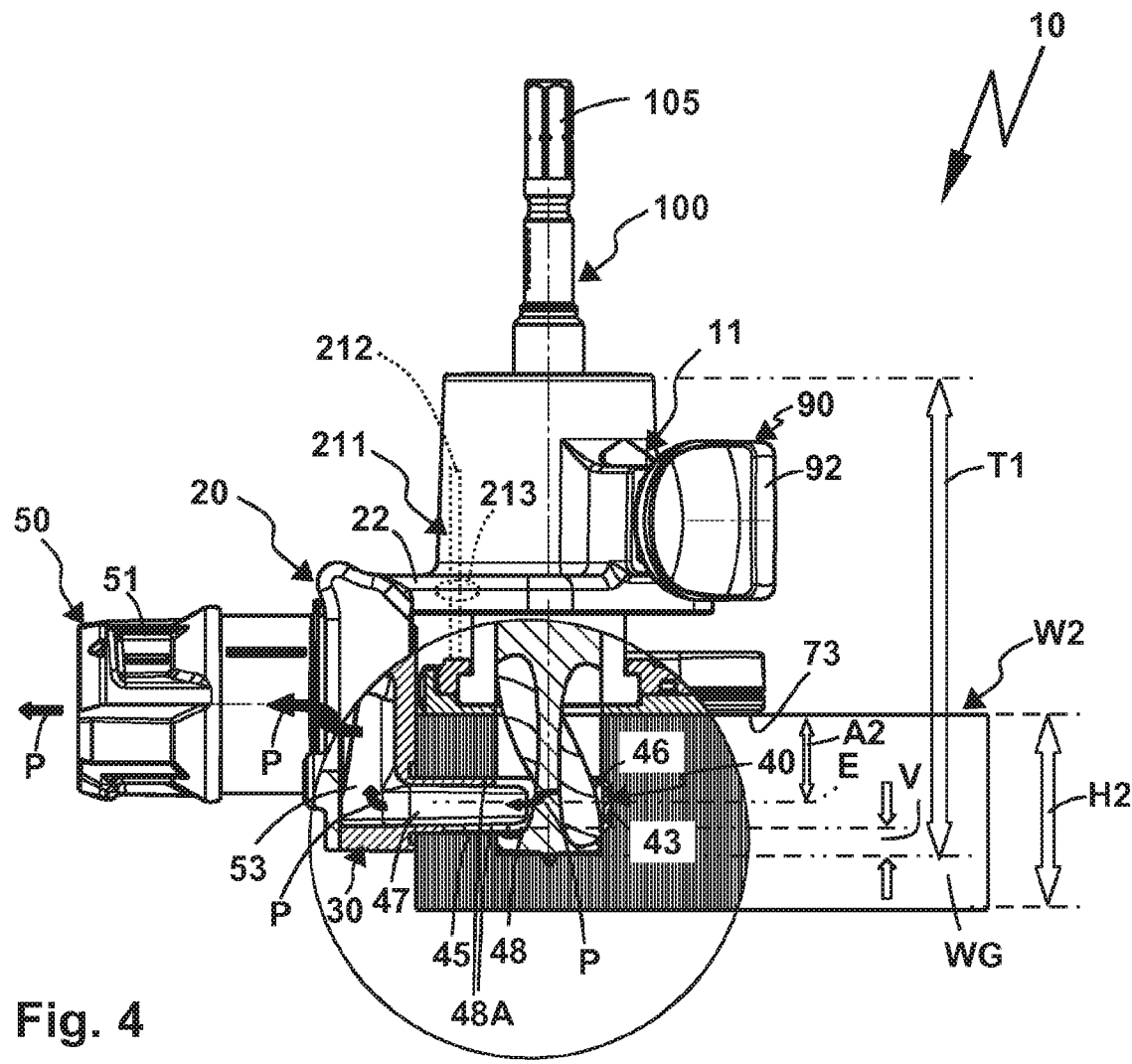

A guide template 10 is used to produce a main-side cut-out HA in a workpiece W, which already has a secondary-side cut-out NA. The secondary-side cut-out NA extends from a workpiece secondary-side surface WN parallel to a workpiece main-side surface WH, for example a workpiece surface or upper side of the workpiece W. Opposite the workpiece secondary-side surface WH, the workpiece W has a workpiece base-side WG, for example a lower side. FIGS. 3 and 4 clearly show that different workpieces, W1 and W2, are to be machined with the guide template 10, said workpieces having different workpiece heights, H1 and H2, i.e. different distances between the workpiece main-side surface WH and the workpiece base side WG.

The workpiece main-side surface WH and the workpiece secondary-side surface WN are at an angle to one another, for example at a right angle to one another. The workpiece main-side surface WH and the workpiece secondary-side surface WN adjoin one another at a workpiece edge.

The different workpiece heights, H1 and H2, mean, for example, that the distance between the respective secondary-side cut-out NA and the workpiece main-side surface WH is differently sized when, as with workpieces W1 and W2 (FIGS. 3, 4), the secondary-side cut-out NA is incorporated about in the middle between the workpiece main-side surface WH and the workpiece base side WG. However, the main-side cut-out HA should not only be produced with the same angle conditions, for example at a right angle, with respect to the secondary-side cut-out NA, but also with a length such that an intersection region SB, in which the main-side cut-out HA and the secondary-side cut-out NA intersect, is designed geometrically similar. It is particularly desirable that an overhang V, with which the main-side cut-out HA protrudes over the secondary-side cut-out NA on the side facing away from the workpiece main-side surface WH, remains the same, respectively. It is thereby possible to insert a fitting 200 into the workpiece cut-outs HA and the secondary-side cut-out NA. The fitting 200 comprises, for example, a fitting element 201, which is to be inserted into the secondary-side cut-out NA. In doing so, fitting element 201 engages a second fitting element 202, which is inserted into the main-side cut-out HA.

Fitting element 201 is additionally supported by the support body 208, which has a flatly rectangular outer circumferential contour and is accommodated in the secondary-side cut-out NA in a form-fitting manner.

Fitting element 202 has an insertion mount 203, into which an insertion end 204 of fitting element 201 is to be inserted and which is to be clamped with a clamping element 205 of fitting element 202. FIG. 8 shows that fitting element 202 protrudes in front of the other fitting element 201, on the side in front of fitting element 201, said side facing away from the clamping element 205 or the workpiece main-side surface WH, which is why the overhang V should be provided as precisely as possible and in at least a predetermined length.

Fitting element 201 may be connected to a third fitting element 207 with its longitudinal end 206 facing away from fitting element 202 or may have fitting element 207, which is inserted, for example, into the workpiece W3, namely into a workpiece mount WA.

Figure 1:
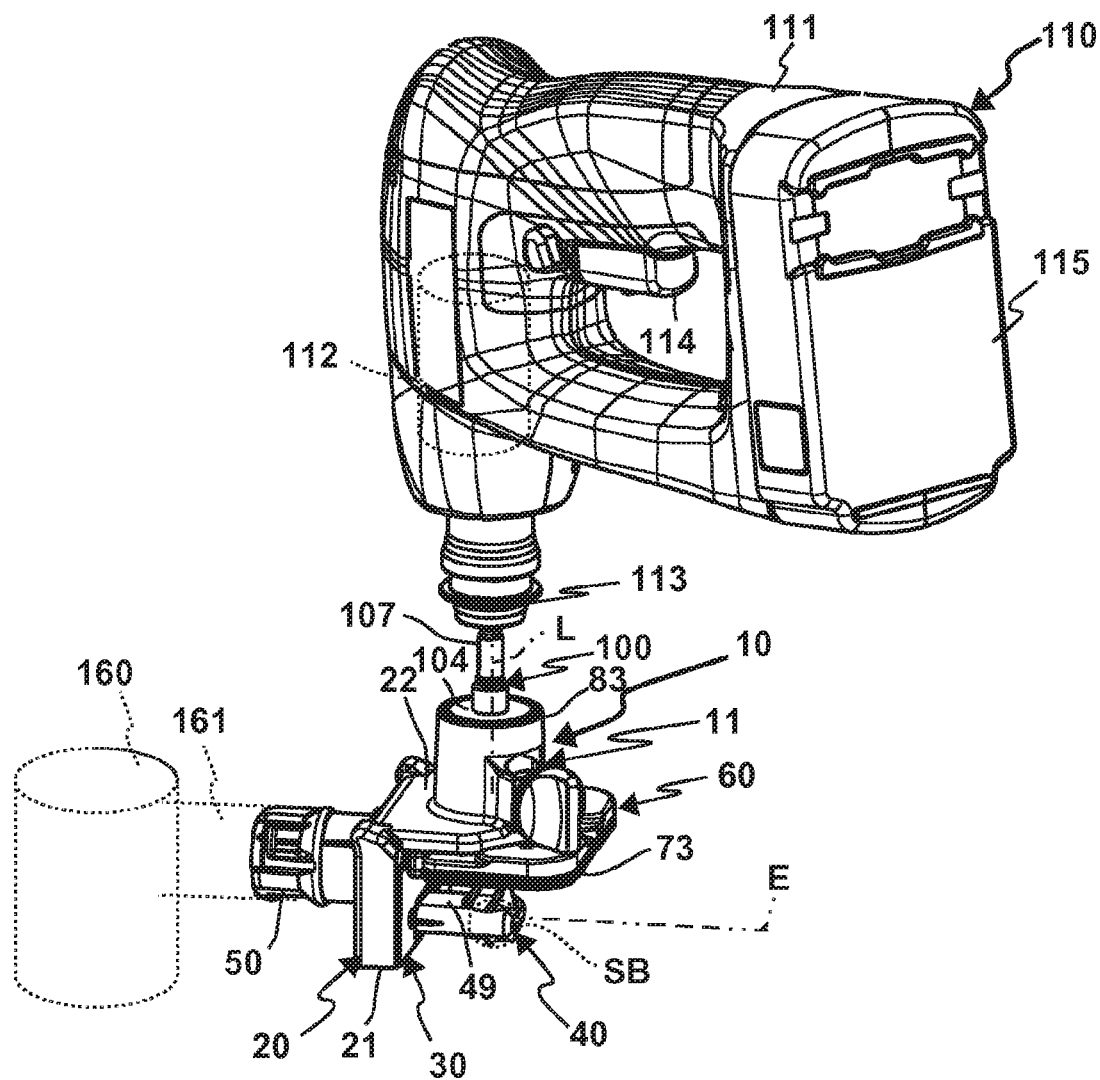
FIG. 1 a perspective oblique view of the guide template as well as a manual power tool for driving a working tool as well as a vacuum cleaner, FIG. 2 a perspective oblique view of a manual power tool for producing a secondary-side cut-out, FIG. 3 a side view of the guide template according to FIG. 1 engaging a workpiece in a first adjustment position of the main-side stop surface, FIG. 4 the arrangement according to FIG. 3 but with the main-side stop surface in a second adjustment position, FIG. 5 an exploded view of the guide template according to the previous figures, FIG. 6 a perspective oblique view of the guide template according to the previous figures from the side of its suction connection, FIG. 7 a main-side stop of the guide template according to FIG. 6, FIG. 8 a variant of the guide template according to FIG. 6 with an adjustable depth stop, FIG. 9 a perspective view of a fitting, which can be inserted into a main-side cut-out producible with the guide template, FIG. 10 a cross-sectional view through the workpiece according to FIG. 3, which is connected to a further workpiece by means of the fitting according to FIG. 9.
Figure 2:
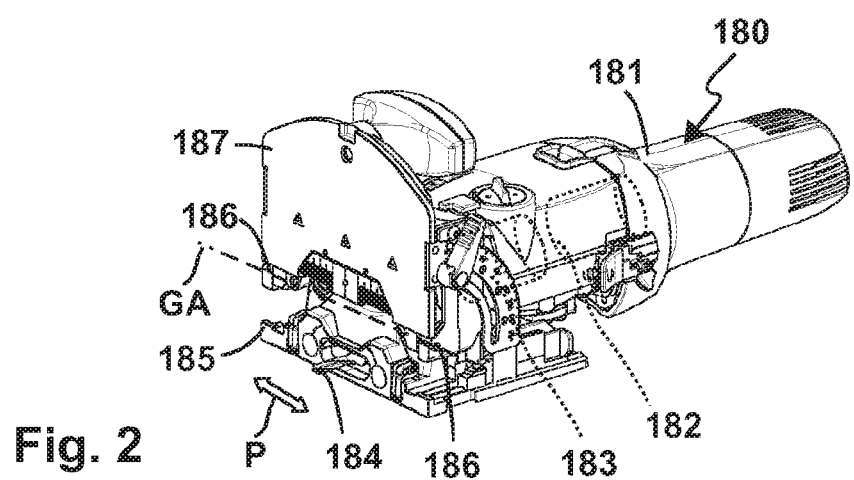

The workpiece mount WA has approximately the same flatly rectangular shape with rounded narrow sides, like the secondary-side cut-out NA, and can be produced, for example, by means of the device shown in FIG. 2, namely a milling machine 180. The milling machine 180 has a housing 181, in which a drive motor 182 and a gear 182 are arranged, said gear being driven by the drive motor 182. On the one hand, the gear 183 has a rotary drive for a milling tool 184 of the milling machine 180; on the other hand, it also has a pendulum gear to the extent that the milling tool 184 implements a pendulum movement P such that a slotted hole or a flatly rectangular workpiece cut-out, for example the workpiece cut-out WA or the secondary-side cut-out NA, can be produced with the milling machine 180.

In doing so, the frontal stop 185 of the milling machine 180 expediently protrudes in front of the milling tool 184, for example makes contact with the workpiece secondary-side surface WN, such that the milling tool 184 can engage workpiece W1, W2, or W3. In this case, there is also a height stop possible, for example in that an angular stop 187 is pivoted about a pivoting axis GA by means of pivot bearings 186 to the extent that the angular stop 187 or the stop surface thereof forms an angle with respect to the frontal stop 185 or the stop surface thereof, for example forms a right angle. The angular stop 187 can establish contact, for example, with the workpiece base side WG or the workpiece main-side surface WH, in order to incorporate the secondary-side cut-out NA into the respective workpiece W1, W2.

The accuracy achievable by the milling machine 180 when producing the secondary-side cut-out NA and/or the workpiece mount WA, however, is also desirable when producing the main-side cut-out HA, for which the guide template 10 is usable.

The guide template 10 has a tool guide 85 for guiding a working tool 100, for example of a drilling tool 107.

The working tool 100 has a cutting section 101 with an end-face cutting edge 108, which can be used to drill or cut into the workpiece main-side surface WH. At least one spiral chip-conveying channel 109 extends from the end face 102 with the cutting edge 108 or cutting edges 108 in the direction of a shaft 106 of the working tool 100, which is used for connection to a manual power tool 110.

The manual power tool 110, for example, is a drilling device or screwing device with a housing 111, in which a drive motor 112, i.e. a rotary drive, is arranged. The drive motor 112 directly drives a tool mount 113 via a gear, which is not shown, and can be switched on and off via a drive switch 114. The manual power tool 110 may be a manual power tool connected to power, which can be connected to a power supply network of particularly 120 V or 230 V alternating current using a connection cable. In this case however, an energy storage device 115, for example a battery pack, is provided for supplying power to the manual power tool 110. The drive motor 112 drives the tool mount 113 about an axis of rotation DA.

The working tool 100 has, for example, driving contours 105, particularly a hexagon on its shaft 106, it being possible for said hexagon to engage the tool mount 113 in a form-fitting or rotationally locked manner. Alternatively, a round shaft 106, which can be clamped with a drill chuck, would also be possible.

A flange 103, which has a counter stop 104 for making contact with a depth stop 80 of the guide template 10, is provided between the shaft 106 and the cutting section 105.

The depth stop 80 is arranged on a carrier body 20 of the guide template 10.

The carrier body 20 is an angular body and comprises a contact leg 21, which is assigned to the workpiece secondary-side surface WN, as well as a carrier leg 22, which is arranged at an angle, particularly a right angle, with respect to the contact leg 21 and which supports the depth stop 80.

A wall body 23 of the contact leg 21 could be designed or formed, for example, for direct contact with the workpiece secondary-side surface WN. In this case, instead of support ribs 24, which are provided on a side 29 of the wall body 23 facing the carrier leg 22, they are designed, for example, such that, as a whole, they define a planar surface and/or their end-face surfaces or front-side surfaces are situated in a common flat plane to the extent that they can make direct contact with the flat and planar workpiece secondary-side surface WN. Consequently, the contact leg 21 in this case would thus directly form a secondary-side stop.

In this case however, a separate body, hereinafter characterized as the secondary-side stop 30, is given for providing a secondary-side stop surface 35.

The secondary-side stop 30 has a wall body 31, which is connected to the contact leg 21, for example bonded and/or screwed and/or latched.

For a screw connection, the contact leg 21 has screw openings 25, which are flush with screw openings 32 of the wall body 31 and are used for screwing in screws 26, particularly from the side of the contact leg 21 facing away from the wall body 31.

In addition, the wall body 31 may be held on the carrier body 20 in a form-fitting manner, for example in that assembly protrusions or insertion protrusions 33 engage the insertion mounts 28 of the contact leg 21. The insertion protrusions 33 are arranged, for example, in corner areas or on corner areas of the wall body 23. The insertion mounts 28 are situated in the vicinity of the carrier leg 22, for example in an inner corner area between the contact leg 21 and the carrier leg 22. Protrusions 27 are provided there, for example, which protrude in the direction of the support ribs 24 and behind which the insertion mounts 28 are provided.

The secondary-side stop 30 has the secondary-side stop surface 35, which is provided and designed for making contact with the workpiece secondary-side surface WN. The secondary-side stop surface 35 is a planar surface, just as a main-side stop surface 73 provided for making contact with the workpiece main-side surface WH.

Intake openings 34, which are in a fluid connection with a suction connection 51 of a suction device 50 of the guide template 10, are provided in the area of the secondary-side stop surface 35.

The secondary-side stop 30 and/or the wall body 31 on the contact leg 21 has further support by means of a side leg 36, which protrudes on a side facing away from the secondary-side stop surface 35 or opposite the secondary-side stop surface 35 with respect to the contact leg 21 and which has contact on the front side with the wall body 23, for example, next to the support ribs 24. The side leg 36 and the insertion protrusions 33 are arranged on opposite sides of one another or in edge areas of the secondary-side stop 30 of the wall body 31, said edge areas being opposite one another.

An engagement protrusion 40, which protrudes in front of the secondary-side stop surface 35, is provided on the secondary-side stop 30. The engagement protrusion 40 is used for engaging the secondary-side cut-out NA. The engagement protrusion 40 has a flat shape, which matches the secondary-side cut-out NA, with flat sides 41 as well as narrow sides 42 which are outwardly rounded. The narrow sides 42 as well as the flat sides 41 define an outer circumference 49 of the engagement protrusion 40, the contour of which substantially corresponds to the inner circumference or to the inner circumferential contour of the secondary-side cut-out NA. Accordingly, the engagement protrusion 40 can substantially engage the secondary-side cut-out NA in a form-fitting manner and be supported there. The result of this is that the secondary-side engagement protrusion 40 implements an alignment of the engagement protrusion 10 as relates to the workpiece W1, W2. At the same time, the secondary-side stop surface 35 has contact with the workpiece secondary-side surface WN to the extent that a relative position of a tool guide 85 of the guide template 10 is thereby defined as relates to the secondary-side cut-out NA. As an alternative to establishing contact of the secondary-side stop surface 35 with the workpiece secondary-side surface WN or as a supplement thereto, it is also possible that an end face 43 of the engagement protrusion 40 makes contact at a base or other surface opposite its end face, when the engagement protrusion 40 engages the secondary-side cut-out NA.

It is advantageous when an upper side facing the main-side stop surface 73 and/or a lower side 45 opposite the upper side 44, that is at least one of the two flat sides 41, establishes contact with the assigned flat sides of the secondary-side cut-out NS.

It is particularly expedient when a side of the engagement protrusion 40, said side facing away from the main-side stop surface 73, for example the lower side 45, is provided or arranged in order to establish contact with a flat side NU assigned thereto of the secondary-side cut-out NS. Consequently, the guide template 10 is thus expediently supported with the lower side 45 or, in general terms, with a side of the engagement protrusion 40, said side facing away from the main-side stop surface, on the workpiece W, namely the secondary-side cut-out NS thereof.

It is further expedient when an intake opening 46, which is in a fluid connection with the suction device 40, particularly the suction connection, is provided on the engagement protrusion 40. Thus, chips created during the production of the main-side cut-out HA by means of the working tool 100 or other particles directly from the drill hole to be produced, namely the main-side cut-out HA, can be suctioned away.

A flow channel 47, which communicates with the intake opening 46 as well as with the suction connection 51, extends within the inside of the engagement protrusion 40. Furthermore, the suction connection 51 fluidically communicates with an intake opening 52, which extends, for example, between ribs 43 of the support ribs 24. Consequently, the wall body 41 is arranged a distance away from the side surface of the side 29 of the contact leg 21 to the extent that one or more flow channels or flow connections extend between wall body 21 and wall body 23, between the intake openings 46, 52 on one side and the suction connection 51 on the other side.

Furthermore, the wall body 23 of the contact leg 21 has side legs 55, which protrude to the wall body 31 of the secondary-side stop 30 to the extent that the flow channels or flow chambers, which are arranged between wall body 23 and wall body 31, are thereby laterally sealed off or closed so to speak.

For example, if a suction channel element or suction tube 161 of a suction device 160 is connected at the suction connection 51, a fluid connection is established between the intake openings 46, 52 and the suction device 160, through which a particle flow P can then flow when a suction unit of the suction device 160 is being operated; to this end, refer particularly to the schematic representation in FIG. 4. The intake openings 46, which extend close to the main-side stop 60 described in more detail in the following, particularly the main-side stop surface 73 thereof, ensure that an intermediate space is effectively suctioned between the main-side stop surface 73 of the main-side stop 60 and the workpiece main-side surface WH. Thus, when the working tool 100 produces chips, dust, or other particles during machining of the workpiece W1, W2, these particles are effectively suctioned from both the working tool WH as well as from the main-side cut-out HA.

The main-side stop 60 has a stop body 61, the upper side 62 of which is assigned to or facing the carrier leg 22, and, on the contact side 63 thereof facing away from the carrier leg 22, a contact body 40 is provided for establishing contact with the workpiece W1, W2, namely the workpiece main-side surface WH. The stop body 61 is particularly designed in the shape of a plate or as a plate.

The stop body 62 is guided on the carrier body 20 in a twist-resistant manner. For example, it has twist-prevention contours 64 on its narrow side facing the contact leg 21 and/or its narrow side has contact with the secondary-side stop surface 35 via a longitudinal region.

The contact body 70 is supported on the stop body 61 in a form-fitting manner. The contact body 70 has, for example, a plate body 71, with the side of which facing the contact leg 21 providing the main-side stop surface 73. The support side 72 of the plate body 71 or of the contact body 70, said support side facing away from the main-side stop surface 73, has contact with the contact side 63 of the main-side stop 60 or the stop body 61. Preferably, ribs 74 or a rib structure is arranged on the support side 72 such that the plate body 71 is supported via said rib structure or ribs 74 on the contact side 63.

Preferably, the stop body 61 of the main-side stop 60 is made of a material that is more solid than the contact body 70, for example is made of a correspondingly hard plastic or made of metal. In contrast, the contact body 70 is preferably elastically flexible such that it can establish contact with the workpiece main-side surface WH without damaging it.

Of course, it is also advantageous with the secondary-side stop surface 65 when it is flexible or elastic and/or consists of a flexible, for example elastic, plastic material, rubber, or the like.

Consequently, it is thus advantageous when both the secondary-side stop 30 and the contact body 70 of the main-side stop 60 or the respective stop surface thereof are elastic, for example made of rubber or a resiliently elastic plastic material.

Latching protrusions or hooking protrusions 77, which are provided in the area of the twist-prevention contour 64 or of the corner areas of the stop body 61 for engaging latching mounts or hooking mounts 67, protrude in front of the plate body 71. Consequently, the contact body 70 can thus be hooked or become hooked together with the stop body 61.

Further retention of the contact body 70 on the main-side stop 60 or the stop body 61 is provided by a screw connection. Thus, for example, screws 66 are inserted through screw mounts 75 of the contact body 70 and screwed into screw mounts 65 of the stop body 61.

A guide element 88 of the tool guide 85 is fixed in position on the main-side stop 60. The guide element 85 further has a tube body 89. An inner circumferential contour 86 of the tube body 89 or of the guide element 88 is circular or round in this case, matching a correspondingly circular outer circumference of the cutting tool or of the working tool 100.

Thus, the working tool 100 can be guided, displaced longitudinally, in the guide element 88 and thus the tool guide 85, along a guide longitudinal axis L.

Preferably, the guide element 88 is solidly connected and/or forms a single piece with the main-side stop 60 or the stop body 61.

The guide element 88, for example, is inserted into a mount 68 of the main-side stop 60 or stop body 61, particularly pressed into.

A flange protrusion or retention protrusion 87 of the tube body 89 or of the guide element 88 is expediently supported on a support surface 76 of the contact body 70. The support surface 76 is annular and extends about a passage 78, which is coaxial as relates to the mount 68. The cross-section of the passage 78 corresponds at least to the cross-section or guide cross-section of the guide element 88 to the extent that the working tool 100 can also penetrate the passage 78.

The retention protrusion 87 or flange is retained, like a sandwich, between the contact body 70 and the stop body 61; refer to the example in FIGS. 3 and 4.

A section of the guide element 88, said section facing away from the main-side stop surface 73, penetrates a guide body 81, which is provided on the carrier body 20. For example, the guide body 81 has a guide mount 82, on the inner contour of which the outer contour of the guide element 88 is guided directly or preferably via support ribs 84 or guide ribs.

The guide body 81 protrudes in front of the carrier leg 22 on a side of the carrier leg facing away from the main-side stop 80. For example, the guide body 81 is in the form of a bush or dome. The guide body 81 could also be characterized as a guide bush.

A stop protrudes radially inward into the guide mount 82 on a free end region of the guide body 81, said end region facing away from the carrier body 20. This stop may form a stop for the guide element 88. However, the main function is to provide a depth stop surface 83 on the side of the guide body 81, said side facing away from the main-side stop 60, with it being possible for the counter stop 104 of the working tool 100 to make contact with the guide body.

Because the engagement protrusion 40 and the depth stop surface 84 have a fixed, non-adjustable relation to one another (FIGS. 3 and 4), the penetration depth of the working tool 100 into the workpiece W1, W2 is always the same. For example, a depth-setting distance T1 is specified between the depth-stop surface 83 and the end region of the overhang V, said end region protruding over the engagement protrusion 40.

A cut-out 48, particularly a passage, is provided for the working tool 100 on the engagement protrusion 40. The working tool 100 can penetrate the engagement protrusion 40 on the cut-out 48 and thus produce, for example, the main-side cut-out HA with the overhang V. In this case, it is especially advantageous that the engagement protrusion 40 has contact with one or more circumferential regions of the cut-out 48 on the workpiece W, i.e. in the secondary-side cut-out NA, for example with contact surfaces 48A which are provided on at least one of the flat sides 41, particularly the lower side 45, of the engagement protrusion 40. The workpiece W is thereby less torn or not torn in the area of the main-side cut-out HA to be produced. For example, few or no wood splinters result from the base material of the workpiece W.

It is possible that an outer circumference of the working tool 100, for example in close proximity to the counter stop 104, is guided through the inner circumference 83B of the stop 83A, in which the depth stop surface 83 is provided, and also through the inner circumferential contour 86 of the guide element 88. The working tool 100 is then guided by the tool guide 85 in regions spaced apart from one another with respect to the guide longitudinal axis L.

To prevent or reduce tension, it is advantageous, however, when the inner circumference 83B of the stop 83A has a greater cross-section than the inner circumferential contour 86 of the guide element 88 to the extent that the working tool 100 is guided on its outer circumference only and/or exclusively by means of the inner circumferential contour 86 of the guide element 88 and without contact with the inner circumference 83B of the stop 83A.

The tool guide 85 simultaneously forms a component of the one adjusting device 11, with which a main-side stop distance A1 or A2 or further main-side stop distances, which are not shown in the drawing, can be adjusted between the engagement protrusion 40 and the main-side stop surface 73. The main-side stop distance, A1 or A2, is the distance, for example, between the longitudinal axis E of the engagement protrusion 40 or the center axis between the engagement protrusion 40 and the main-side stop surface 73. However, the main-side stop distance, A1 or A2, could also easily be defined, for example, as the distance between the main-side stop surface 73 and a surface, opposite thereto, of the outer circumference of the engagement protrusion 40, for example of a flat side 41 of the engagement protrusion 40, for example the upper side 44. Consequently, a relative distance between the main-side stop surface 73 and the engagement protrusion 40 can thus be adjusted by means of the adjusting device 11.

The guide mount 82 forms a linear bearing mount or slide bearing mount for a bearing element of the adjusting device 11 and/or of the tool guide 85. Thus, for example, the guide element 88 of the tool guide 85 forms such type of bearing element.

The bearing element or guide element 88 is mounted, in a sliding manner, on the guide mount 82 or on the guide body 81 coaxially with respect to the guide longitudinal axis L.

Thus, the main-side stop distances, for example A1 or A2 or further distances, can be adjusted particularly variably.

A position-fixing device 90 is used to fix the position of the adjusting device 11 in said main-side stop distances, e.g. A1 and A2. The position-fixing device 90 comprises, for example, a clamping body 91, particularly a clamping screw or the like. The clamping body 91 can be actuated by means of a manually operable control element 92, for example a control knob or the like. A screw section 93 can be screwed into a nut 94, which is retained in a bracket 96 on the guide body 81. A passage 95 is provided on the guide body 81 coaxially with the screw opening of the nut 94, said passage being penetrated by the screw section 93 such that it can be clamped for engagement, with its head against the guide element 88.

Of course, instead of clamping, latching or another longitudinal specification of the guide element 88 as relates to the guide body 81 would also be possible in order to fix the main-side stop surface 73 in position some distance away from the engagement protrusion 40, said position being selected by the operator.

Of course, it is not absolutely necessary that the tool guide simultaneously forms the adjusting device of a guide template according to the invention. This is shown in an exemplary embodiment of an adjusting device 211 (FIG. 4). For example, one or more guide elements 212, particularly guide rods, protrude in front of the main-side stop 60 in the direction of the carrier body 20 and engage guide mounts 113 of same. The guide elements 212 are mounted in the guide mounts 213, in a manner so as to move longitudinally, parallel to the guide longitudinal axis L. The guide elements 212 can be fixed in one or more positions as relates to the carrier body 20 or to the carrier leg 22, for example, by means of clamping devices, latching devices, or the like with respect to the guide longitudinal axis L.

Furthermore, a fixed depth stop so to speak, i.e. a fixed depth-setting distance T1, is not absolutely necessary. It could also be designed adjustably, which is shown more clearly in FIG. 8. Thus, for example, a depth-setting device 280 can be provided on the carrier body 20. The depth-setting device 280 comprises, for example, a guide element 281, which is coaxial as relates to the guide element 88. The guide element 281 is mounted on the guide mount 82 in a manner so as to move longitudinally as relates to the guide longitudinal axis L. In contrast with the previous exemplary embodiments, this mount actually does not have the depth stop surface 83. In fact, a depth stop surface 283 is provided on the guide element 281, for example on the free longitudinal end or longitudinal end region thereof facing away from the carrier body 20.

With respect to the carrier body 20 and particularly the guide body 81, the guide element 281 can be fixed in one or more longitudinal positions as relates to the guide longitudinal axis L, for example in depth-setting distances T1 or T2. A position-fixing device 282 is provided for this, for example a clamping screw of the type as with position-fixing device 90.

At this juncture, it should be noted additionally that of course any other type of clamp or form-fitting position-fixing is also possible instead of position-fixing device 90 with a clamping screw, for example with a clamping collar or a clamping ring, which provides for clamping or position-fixing in a clamping position of the outer circumference of the guide element 88.

Figure 11:
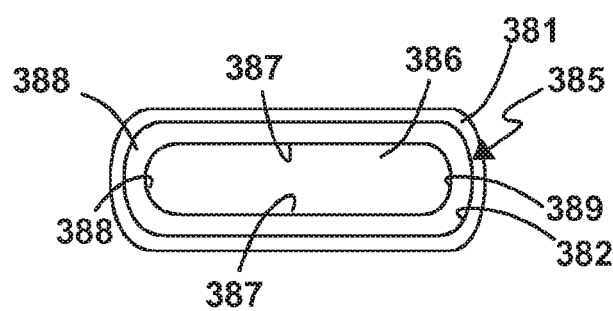
FIG. 11 a top view of a guide element of a tool guide with a guiding contour or inner circumferential contour, which has a flat shape.
Figure 5:
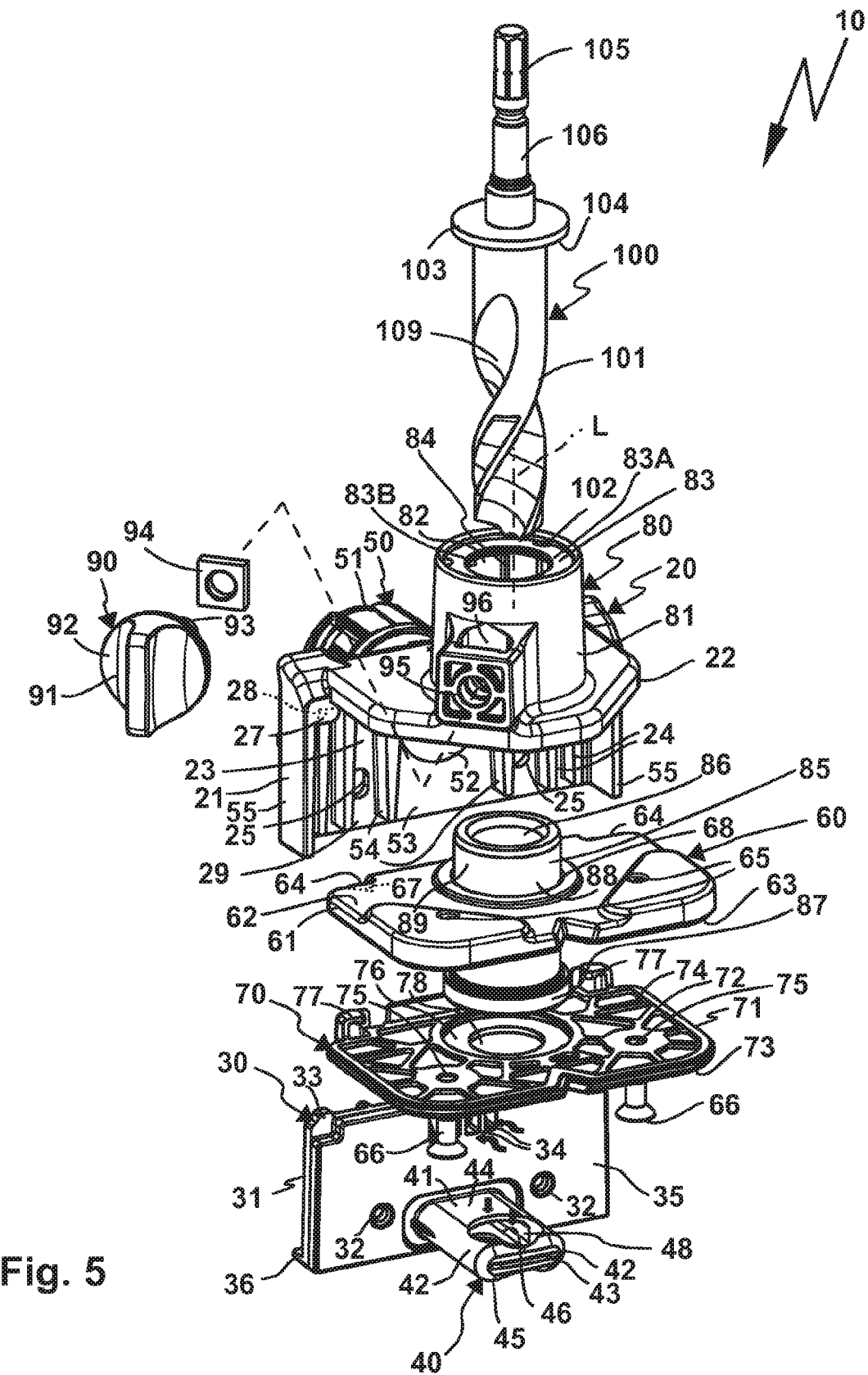

A guide element 388, indicated in FIG. 11, of a tool guide 385, which guide element may be provided in a guide body 381, which may be provided on the carrier body 20 instead of guide body 81, has an inner circumferential contour 386 with a flat shape. The inner circumferential contour 386 has longitudinal sides 387 opposite one another, between which narrow sides 389, for example rounded narrow sides, extend which are shorter than the longitudinal sides 387. For example, the milling tool 184 of the milling machine 180 can be guided in or on the inner circumferential contour 386 in order to mill a main-side cut-out into the workpiece, W1 or W2, which has a flat shape, for example corresponding to the secondary-side cut-out NA.

The guide element 388 can be mounted on or in a guide mount 382 (corresponding to guide mount 82) in a manner so as to move longitudinally as relates to the guide longitudinal axis L.

The invention claimed is:

1. A guide template having a tool guide for a working tool for producing a main-side cut-out on a main-side surface of a workpiece, which workpiece has a secondary-side surface, which is at an angle to the main-side surface and proceeding from which a secondary-side cut-out extends into the workpiece next to the main-side surface at a distance therefrom, wherein the guide template comprises:
   a main-side stop having a main-side stop surface for making contact with the main-side surface of the workpiece,
   a secondary-side stop, which has an engagement protrusion for engaging the secondary-side cut-out, wherein a longitudinal axis of the engagement protrusion extends toward the tool guide to an intersection region, in which the main-side cut-out to be produced and the secondary-side cut-out intersect, and is at an angle, to a guide longitudinal axis of the tool guide, and
   a depth stop having a depth stop surface for a counter stop of the working tool for limiting the penetration depth of the working tool into the workpiece with respect to the guide longitudinal axis,
   wherein the depth stop and the engagement protrusion are arranged on a carrier body, on which the main-side stop is mounted for adjustment by means of an adjusting device for adjusting a main-side stop distance of the main-side stop surface with respect to the engagement protrusion while a depth-setting distance is retained between the engagement protrusion and the depth stop surface.

2. The guide template according to claim 1, wherein the engagement protrusion has a flat shape with flat sides opposite one another and narrow sides extending between the flat sides for support in the secondary-side cut-out.

3. The guide template according to claim 1, wherein the secondary-side stop has a secondary-side stop surface for making contact with the workpiece secondary-side surface, in front of said secondary-side stop surface the engagement protrusion protrudes.

4. The guide template according to claim 1, wherein a stop surface for making contact with a base of the secondary-side cut-out is provided on an end face of the engagement protrusion.

5. The guide template according to claim 1 wherein the depth stop can be adjusted along the guide longitudinal axis, with respect to a side of the engagement protrusion, said side facing away from the main-side stop surface.

6. The guide template according to claim 1, wherein the engagement protrusion has a cut-out for the working tool.

7. The guide template according to claim 1, wherein the engagement protrusion has at least one contact surface for making contact with the workpiece directly next to the main-side cut-out to be produced by the working tool.

8. The guide template according to claim 1, wherein the adjusting device is arranged on the tool guide or formed by the tool guide.

9. The guide template according to claim 1, wherein the adjusting device is formed by means of a guide element of the tool guide, said guide element being adjustable along the guide longitudinal axis as relates to the carrier body.

10. The guide template according to claim 1, wherein the depth stop surface is fixed in position as relates to the carrier body or wherein the guide template has a depth-setting device for adjusting a relative position of the depth stop surface as relates to the engagement protrusion.

11. The guide template according to claim 1, wherein the carrier body has a carrier leg and a contact leg, which are at an angle to one another, wherein the adjusting device is arranged on the carrier leg and the secondary-side stop with the engagement protrusion is arranged on the contact leg.

12. The guide template according to claim 1, wherein the tool guide is provided completely or partially on the main-side stop or completely or partially on the carrier body.

13. The guide template according to claim 1, wherein the tool guide is a single component separate from the carrier body of the guide template.

14. The guide template according to claim 1, wherein the tool guide has guiding contours, which are exclusively unmovable with respect to one another, for the working tool.

15. The guide template according to claim 1, wherein the depth stop is provided on the tool guide or next to the tool guide and/or forms a component of the tool guide.

16. The guide template according to claim 1, wherein the tool guide is telescopic as relates to the guide longitudinal axis.

17. The guide template according to claim 1, wherein the tool guide has a guide element guiding the carrier body and/or forming a component of the adjusting device.

18. The guide template according to claim 1, wherein the main-side stop is adjustably mounted and/or can be fixed on the carrier body by a guide element of the tool guide as relates to the guide longitudinal axis.

19. The guide template according to claim 1, wherein the carrier body has a dome-shaped guide mount for a guide element of the tool guide.

20. The guide template according to claim 19, wherein a position-fixing device is arranged on the guide mount for fixing the position of the guide element of the tool guide as relates to the guide mount.

21. The guide template according to claim 1, wherein the main-side stop is guided on the carrier body in a non-twisting manner as relates to the guide longitudinal axis.

22. The guide template according to claim 1, wherein the guide template, has a position-fixing device or a latching device or a locking device, for fixing the main-side stop in at least two different main-side stop distances between the engagement protrusion, and the main-side stop surface as relates to the carrier body.

23. The guide template according to claim 1, further comprising a suction device, for suctioning particles which result during machining of the workpiece by the working tool.

24. The guide template according to claim 23, wherein the suction device has at least one intake opening for suctioning particles on the engagement protrusion.

25. The guide template according to claim 1, wherein the main-side stop surface and/or a or the secondary-side stop surface provided to establish contact with the workpiece secondary-side surface are flat surfaces or have a flat shape.

26. The guide template according to claim 1, wherein the tool guide for guiding the working tool has an inner circumferential contour, which limits a guide cross-sectional surface, wherein the guide cross-sectional surface is circular or has a flat shape with longitudinal sides and narrow sides, which are rounded, and which are shorter as relates to the longitudinal sides.

27. The guide template according to claim 1, wherein the guide template forms a component of a system, which comprises the working tool.

28. The guide template according to claim 27, wherein the system comprises a manual power tool with a drive motor for driving the working tool.

* * * * *